United States Patent [19]
Kato et al.

[11] Patent Number: 5,480,104
[45] Date of Patent: Jan. 2, 1996

[54] DEACTIVATING DEVICE FOR LOCKING MECHANISM OF PRETENSIONER

[75] Inventors: Keiichi Kato; Keisuke Imai; Masanori Oyabu; Yasuhiko Kouda; Makoto Isomura; Takuya Nezaki; Koh Watanabe, all of Aichi, Japan

[73] Assignee: Kabushiki Kaisha Tokai-Rika-Denki-Seisakusho, Aichi, Japan

[21] Appl. No.: 357,186

[22] Filed: Dec. 13, 1994

[30] Foreign Application Priority Data

Dec. 29, 1993 [JP] Japan .................................. 5-352334
Mar. 16, 1994 [JP] Japan .................................. 6-045805

[51] Int. Cl.⁶ ..................................................... B60R 22/46
[52] U.S. Cl. ........................................... 242/374; 280/806
[58] Field of Search .......................... 242/374; 280/806; 297/476–480

[56] References Cited

U.S. PATENT DOCUMENTS 5,129,680  7/1992  Mori ........................................ 280/806

FOREIGN PATENT DOCUMENTS 55-8556   7/1978  Japan .
55-45306  9/1978  Japan .
58-6430   3/1983  Japan .

*Primary Examiner*—John M. Jillions
*Attorney, Agent, or Firm*—Sixbey, Friedman, Leedom & Ferguson

[57] ABSTRACT

A deactivating device for a locking mechanism of a pretensioner. The deactivating device includes: an operation lever provided movably about a central axis of rotation and in a direction of the central axis of rotation, and adapted to set the locking mechanism in one of an activated state and a deactivated state; and an urging member for imparting an urging force to the operation lever, wherein the operation lever has a deactivation operation mode for setting the locking mechanism in the deactivated state as the operation lever moves continuously in stages about the central axis of rotation and in the direction of the central axis of rotation against the urging force of the urging member and a position of the operation lever is subsequently held, and an activation operation mode for setting the locking mechanism in the activated state as the operation lever is automatically made to undergo returning movement by the urging force of the urging member from the deactivation operation mode. Since the operation lever requires a two-stage operating motion about the central axis of rotation and in the direction of the central axis of rotation against the urging force of the urging member, the locking mechanism is prevented from being deactivated unnecessarily.

23 Claims, 11 Drawing Sheets

DEACTIVATING DEVICE FOR LOCKING MECHANISM OF PRETENSIONER

BACKGROUND OF THE INVENTION

1. Field of the Invention

The present invention relates to a deactivating device for a locking mechanism of a pretensioner, for use in a pretensioner for forcibly retracting an occupant-restraining webbing of a webbing retractor by being operated, so as to activate or deactivate the locking mechanism of the pretensioner as an operation lever is moved.

2. Description of the Related Art

A seat belt apparatus is adapted to restrain a vehicle occupant by means of a webbing when a vehicle suddenly decelerates. As the clearance between the webbing and the occupant decreases, the time required to restrain the occupant also decreases. For this reason, pretensioners for allowing the webbing to be applied closely around the occupant by forcibly pulling the webbing in the direction of retraction when the vehicle suddenly decelerates, as well as webbing retractors equipped with the pretensioner, have been proposed (e.g., Japanese Utility Model Application Publication No. 58-6430 and Japanese Utility Model Application Laid-Open Nos. 55-8556 and 55-45306).

When the vehicle suddenly decelerates, the pretensioner (and the webbing retractor) of this type is operated to rotate a webbing takeup shaft in the retracting direction. However, since it is necessary to ensure that the pretensioner (and the webbing retractor) is not operated when the pretensioner is assembled onto the vehicle body or is detached therefrom, the pretensioner is provided with a locking mechanism for preventing operation thereof.

The locking mechanism of the pretensioner is arranged such that, for example, as a shaft connected to the locking mechanism is rotated, the pretensioner is set in an operative state or in an inoperative state. If the shaft is rotated by an operation lever, the locking mechanism can be activated or deactivated.

Although, as described above, the locking mechanism of the pretensioner is activated or deactivated as the shaft is rotated by the operation lever, when, for instance, the pretensioner (and the webbing retractor) is assembled onto the vehicle body or is transported in a state in which it is detached from the vehicle body, if the pretensioner is handled carelessly and a large impact or the like acts on the operation lever, there is the possibility of the shaft from becoming rotated undesirably due to the impact or the like acting on the operation lever, thereby deactivating the locking mechanism unnecessarily. Therefore, it is necessary to adopt a measure for reliably maintaining the pretensioner in the deactivated state even in such a case.

SUMMARY OF THE INVENTION

In view of the above-described problems, it is an object of the present invention to provide a deactivating device for a locking mechanism of a pretensioner which is capable of deactivating the locking mechanism of the pretensioner only when it is to be actually deactivated, and of reliably preventing the erroneous operation of the locking mechanism, i.e., the pretensioner.

To this end, in accordance with a first aspect of the present invention, there is provided a deactivating device for a locking mechanism of a pretensioner, for use in a pretensioner which is provided in such a manner as to be capable of forcibly retracting an occupant-restraining webbing of a webbing retractor and has a locking mechanism capable of setting the pretensioner in an operative state and in an inoperative state, the deactivating device comprising: an operation lever provided movably about a central axis of rotation and in a direction of the central axis of rotation, and adapted to set the locking mechanism in one of an activated state and a deactivated state; and an urging member for imparting an urging force to the operation lever, wherein the operation lever has a deactivation operation mode for setting the locking mechanism in the deactivated state and an activation operation mode for setting the locking mechanism in the activated state, and in the deactivation operation mode, the operation lever moves continuously in stages about the central axis of rotation against the urging force of the urging member and in the direction of the central axis of rotation against the urging force of the urging member and a position of the operation lever is subsequently held, while in the activation operation mode, the operation lever is automatically made to undergo returning movement by the urging force of the urging member from the deactivation operation mode.

In accordance with a second aspect of the present invention, in the deactivating device for a locking mechanism of a pretensioner according to the first aspect of the invention, the operation lever has an initial position, a second position to which the operation lever is rotated about the central axis of rotation by a predetermined amount from the initial position in a first direction against the urging force of the urging member, and a third position to which the operation lever is moved from the second position by a predetermined amount in a second direction in the direction of the central axis of rotation against the urging force of the urging member and at which the position of the operation lever is held, and wherein the deactivation operation mode includes the movement of the operation lever from the initial position to the third position via the second position and the holding of the position of the operation lever at the third position.

In accordance with a third aspect of the present invention, in the deactivating device for a locking mechanism of a pretensioner according to the first and second aspects of the invention, the operation lever further has a fourth position to which the operation lever is rotated from the third position in the first direction by a predetermined amount and a fifth position to which the operation lever is moved from the fourth position by a predetermined amount in a third direction which is an opposite direction to the second direction, and wherein the activation operation mode includes the cancellation of a state in which the position of the operation lever is held, and the automatic returning movement of the operation lever from the fourth position to the initial position via the fifth position by the urging force of the urging member.

In accordance with a fourth aspect of the present invention, in the deactivating device for a locking mechanism of a pretensioner according to the first and second aspects of the invention, the activation operation mode includes the cancellation of a state in which the position of the operation lever is held, and the automatic returning movement of the operation lever from the third position to the initial position via the second position by the urging force of the urging member.

In the deactivating device for a locking mechanism of a pretensioner in accordance with the first aspect of the present invention, when the locking mechanism is deactivated to set the pretensioner in the operative state, after the operation lever is temporarily rotated about the axis from the initial position in the first direction (in a forward direction) against the urging force of the urging member, the operation lever is further moved in the second direction (in a pushing-in direction) along the axis against the urging force and is held thereat. As a result, the locking mechanism is deactivated.

Meanwhile, when the locking mechanism is activated again to set the pretensioner in the inoperative state, since the operation lever is urged rotatably about the axis in the opposite direction to the first direction and movably in a pulling-out direction along the axis, the operation lever is automatically returned to the initial position after cancellation of the state in which the operation lever is held. As a result, the locking mechanism is activated again, so that the pretensioner is set in the inoperative state.

Thus, in the deactivating device for a locking mechanism of a pretensioner in accordance with the first aspect of the present invention, when the locking mechanism is deactivated, a two-stage operating motion in different directions, i.e., including the rotation of the operation lever in the first direction and the pushing-in movement thereof in the second direction, is required. Accordingly, when, for example, the pretensioner (and the webbing retractor) is assembled onto the vehicle body or is transported in a state in which it is detached from the vehicle body, even if the pretensioner is handled carelessly and a large impact or the like acts on the operation lever, the operation lever is prevented from being moved properly (i.e., the aforementioned two-stage operating motion is not effected). Hence, the locking mechanism is not deactivated unnecessarily. Namely, the locking mechanism can be deactivated only when it is to be actually deactivated, so that it is possible to reliably prevent the erroneous operation of the locking mechanism, i.e., the pretensioner.

On the other hand, when the locking mechanism is to be activated again, the operation lever is automatically returned to the initial position after the cancellation of the state in which the operation lever is held. Therefore, it is possible to speedily set the locking mechanism in the activated state (set the pretensioner in the inoperative state).

In the deactivating device for a locking mechanism of a pretensioner in accordance with the second and third aspects of the present invention, when the locking mechanism is deactivated to set the pretensioner in the operative state, after the operation lever is temporarily moved to the second position by being rotated about the axis from the initial position in the first direction against the urging force, the operation lever is further moved in the second direction along the axis against the urging force, thereby allowing the operation lever to be held at the third position. Consequently, the locking mechanism is deactivated.

On the other hand, when the locking mechanism is activated again to set the pretensioner in the operative state, if the operation lever is rotated about the axis from the third position in the first direction against the urging force and is thereby shifted to the fourth position, since the operation lever is urged movably in the third direction (in the pulling-out direction) along the axis, the operation lever automatically moves to the fifth position. Additionally, since the operation lever is urged rotatably about the axis in the opposite direction to the first direction, the operation lever is automatically returned to the initial position upon reaching the fifth position. As a result, the locking mechanism is activated again, so that the pretensioner is set in the inoperative state.

Thus, in the deactivating device for a locking mechanism of a pretensioner in accordance with the second and third aspects of the present invention, when the locking mechanism is deactivated, the two-stage operating motion in different directions, i.e., including the rotation of the operation lever in the first direction and the pushing-in movement thereof in the second direction, is required. Accordingly, when, for example, the pretensioner (and the webbing retractor) is assembled onto the vehicle body or is transported in a state in which it is detached from the vehicle body, even if the pretensioner is handled carelessly and a large impact or the like acts on the operation lever, the operation lever is prevented from being moved properly (i.e., the aforementioned two-stage operating motion is not effected). Hence, the locking mechanism is not deactivated unnecessarily. Namely, the locking mechanism can be deactivated only when it is to be actually deactivated, so that it is possible to reliably prevent the erroneous operation of the locking mechanism, i.e., the pretensioner.

On the other hand, when the locking mechanism is to be activated again, the operation lever is automatically returned to the initial position only by the rotation of the operation lever in the first direction (i.e., by a single operating motion). Therefore, it is possible to speedily set the locking mechanism in the activated state (set the pretensioner in the inoperative state).

In the deactivating device for a locking mechanism of a pretensioner in accordance with the fourth aspect of the present invention, when the locking mechanism is deactivated to set the pretensioner in the operative state, after the operation lever is temporarily moved to the second position by being rotated about the axis from the initial position in the first direction against the urging force, the operation lever is further moved in the second direction along the axis against the urging force, thereby allowing the operation lever to be held at the third position. Consequently, the locking mechanism is deactivated.

On the other hand, when the locking mechanism is activated again to set the pretensioner in the operative state, since the operation lever is urged rotatably about the axis in the opposite direction to the first direction and movably in the third direction along the axis, the operation lever is automatically returned to the initial position from the third position via the second position after the cancellation of the state in which the operation lever is held. As a result, the locking mechanism is activated again, so that the pretensioner is set in the inoperative state.

Thus, in the deactivating device for a locking mechanism of a pretensioner in accordance with the fourth aspect of the present invention, when the locking mechanism is deactivated, the two-stage operating motion in different directions, i.e., including the rotation of the operation lever in the first direction and the pushing-in movement thereof in the second direction, is required. Accordingly, when, for example, the pretensioner (and the webbing retractor) is assembled onto the vehicle body or is transported in a state in which it is detached from the vehicle body, even if the pretensioner is handled carelessly and a large impact or the like acts on the operation lever, the operation lever is prevented from being moved properly (i.e., the aforementioned two-stage operating motion is not effected). Hence, the locking mechanism is not deactivated unnecessarily. Namely, the locking mechanism can be deactivated only when it is to be actually deactivated, so that it is possible to reliably prevent the erroneous operation of the locking mechanism, i.e., the pretensioner.

On the other hand, when the locking mechanism is to be activated again, the operation lever is automatically returned to the initial position after the cancellation of the state in which the operation lever is held. Therefore, it is possible to speedily set the locking mechanism in the activated state (set the pretensioner in the inoperative state).

The above and other objects, features and advantages of the present invention will become more apparent from the following description of the invention when read in conjunction with the accompanying drawings.

DESCRIPTION OF THE PREFERRED EMBODIMENTS

Figure 1:
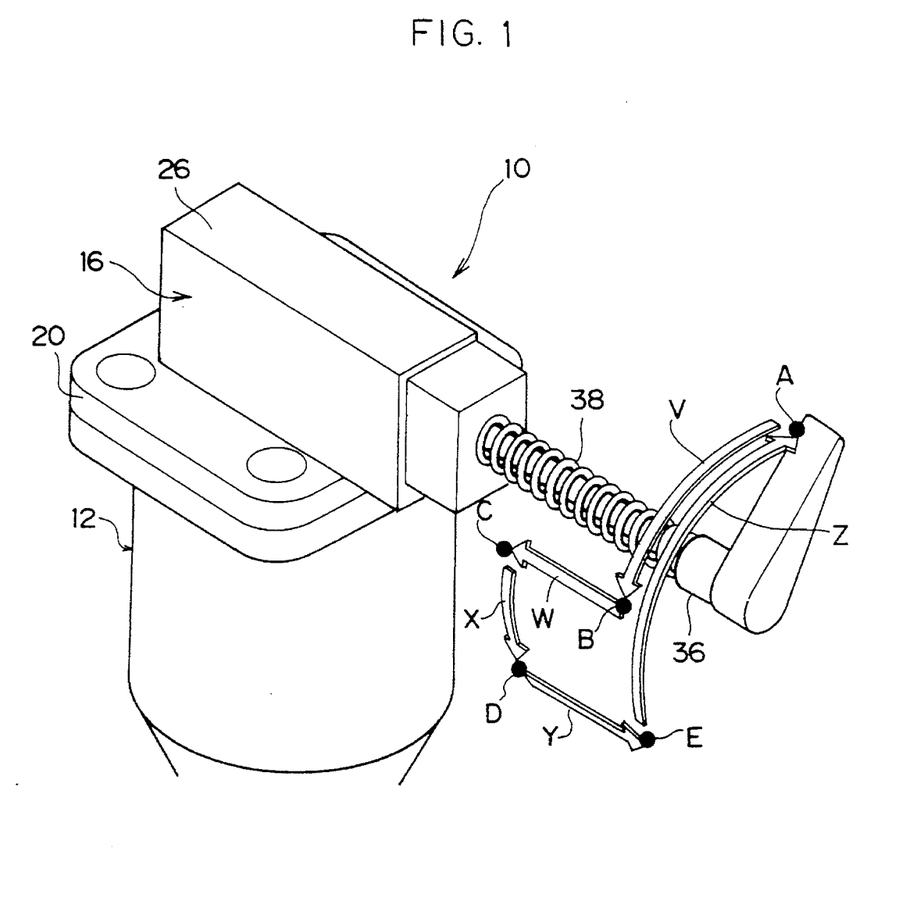
FIG. 1 is a perspective view of a deactivating device for a locking mechanism of a pretensioner in accordance with a first embodiment of the present invention.
Figure 2:
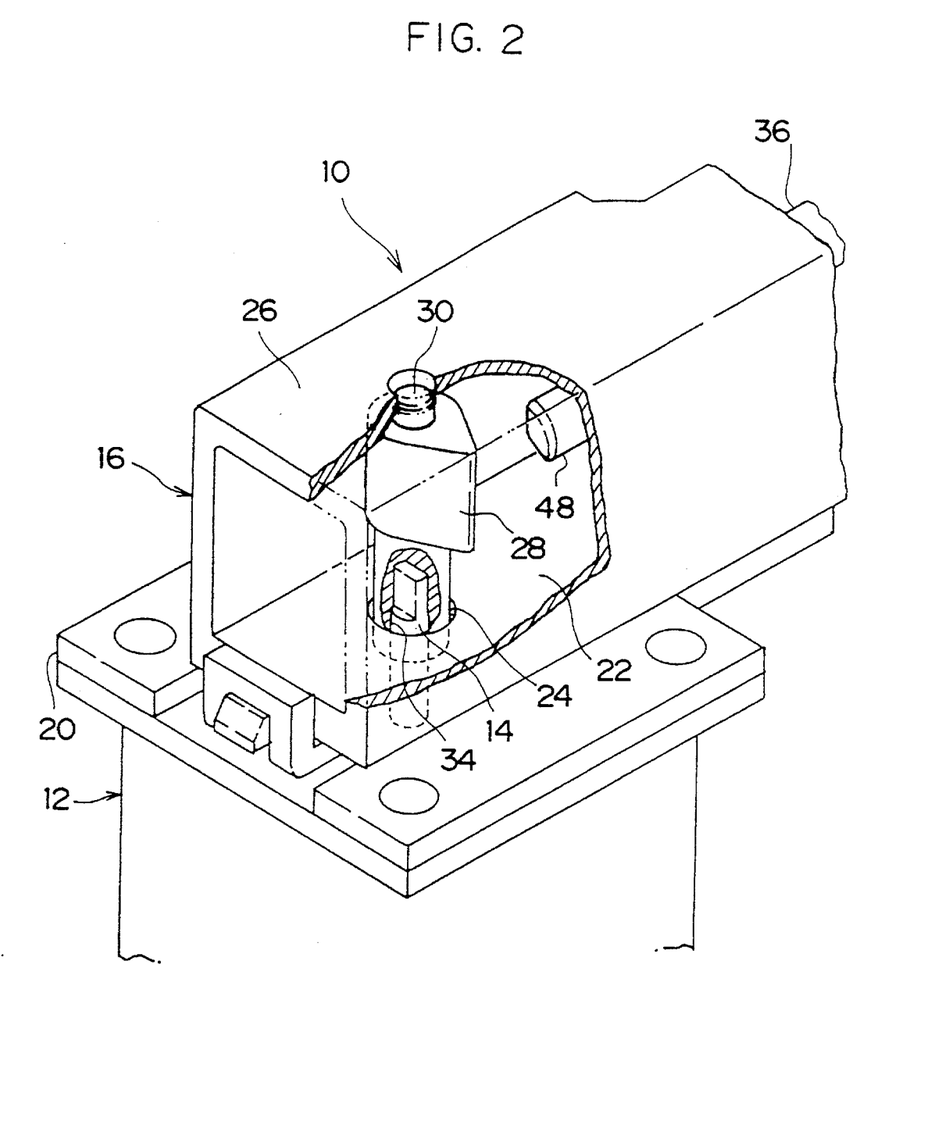
FIG. 2 is a perspective view, with portions broken away, of the deactivating device for a locking mechanism of a pretensioner in accordance with the first embodiment of the present invention.
Figure 3:
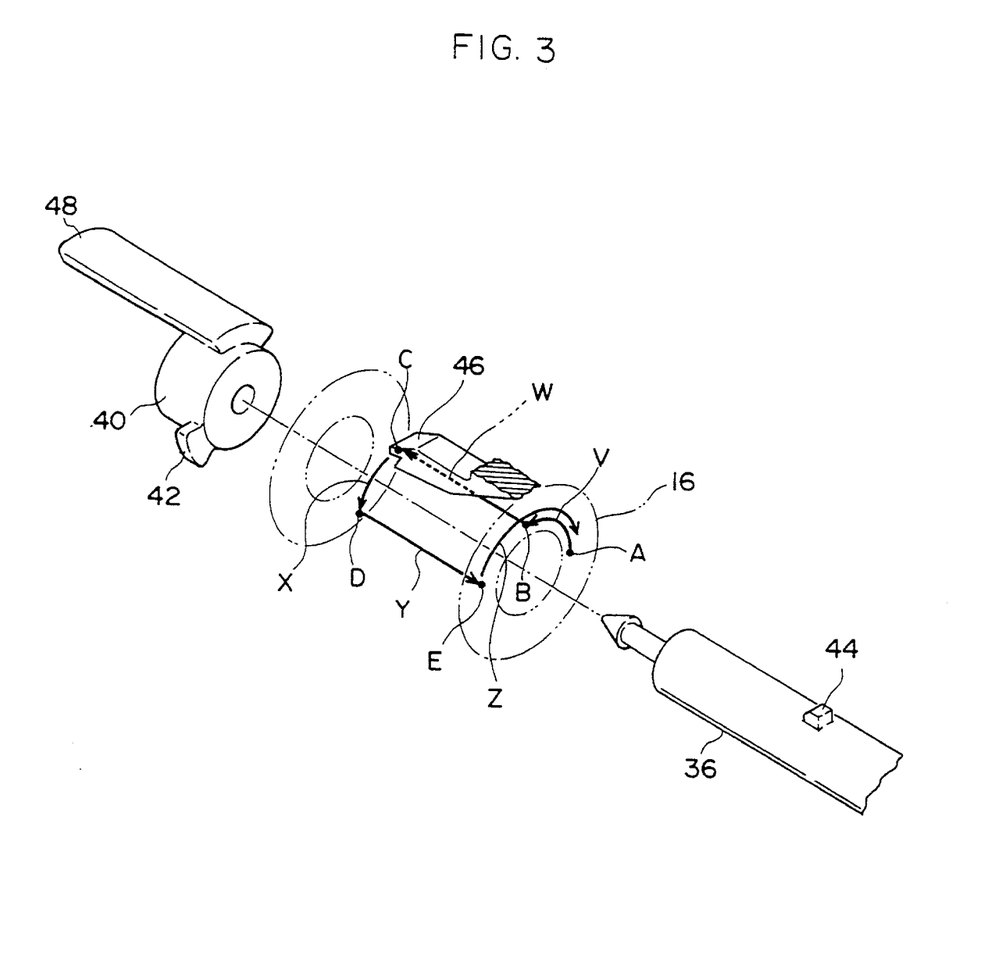
FIG. 3 is a perspective view of a projection and a retainer of the deactivating device for a locking mechanism of a pretensioner in accordance with the first embodiment of the present invention.

FIG. 1 shows a perspective view of a deactivating device 10 for a locking mechanism of a pretensioner in accordance with a first embodiment of the present invention. FIG. 2 shows a perspective view, with portions broken away, of the deactivating device 10, and FIG. 3 shows in perspective major component parts of the deactivating device 10.

The deactivating device 10 is attached to a pretensioner 12. The pretensioner 12, when activated, forcibly retracts an occupant-restraining webbing of a webbing retractor (not shown), and incorporates the locking mechanism. The locking mechanism has a shaft 14. The shaft 14 is rotatively urged by a spring (not shown) incorporated in the pretensioner 12, and is maintained in a safety-mechanism activated state shown in FIG. 2 (i.e., in a state in which the pretensioner 12 is inoperative). As the shaft 14 is rotated against the urging force of the spring, the locking mechanism is deactivated (i.e., is set in a state in which the pretensioner 12 is operative).

The deactivating device 10 has a main body 16 which is attached to the pretensioner 12. The main body 16 is formed in the shape of a box, and is fixed to a base plate 20 of the pretensioner 12. A through hole 24 is formed in a bottom wall 22 of the main body 16, and the shaft 14 of the pretensioner 12 is inserted therethrough and projects into the interior of the main body 16.

Meanwhile, a deactivating lever 28 is supported on the reverse surface side of an upper wall 26 of the main body 16. The deactivating lever 28 is formed in the shape of a column which is substantially elliptic (tongue-shaped) in a plan view, and an upper end of its shaft 30, which is passed through the deactivating lever 28, is supported by the upper wall 26 of the main body 16. A fitting hole 34 corresponding to the shaft 14 of the pretensioner 12 is formed in a lower portion of the shaft 30 of the deactivating lever 28. The shaft 14, which projects through the through hole 24 into the interior of the main body 16, is fitted in the fitting hole 34 so as to be connected to the shaft 30 of the deactivating lever 28. Consequently, the shaft 14 always rotates integrally with the deactivating lever 28.

In addition, an operation lever 36 is supported in the main body 16 in such a manner as to be movable in its axial direction and rotatable about its axis.

Figure 4:
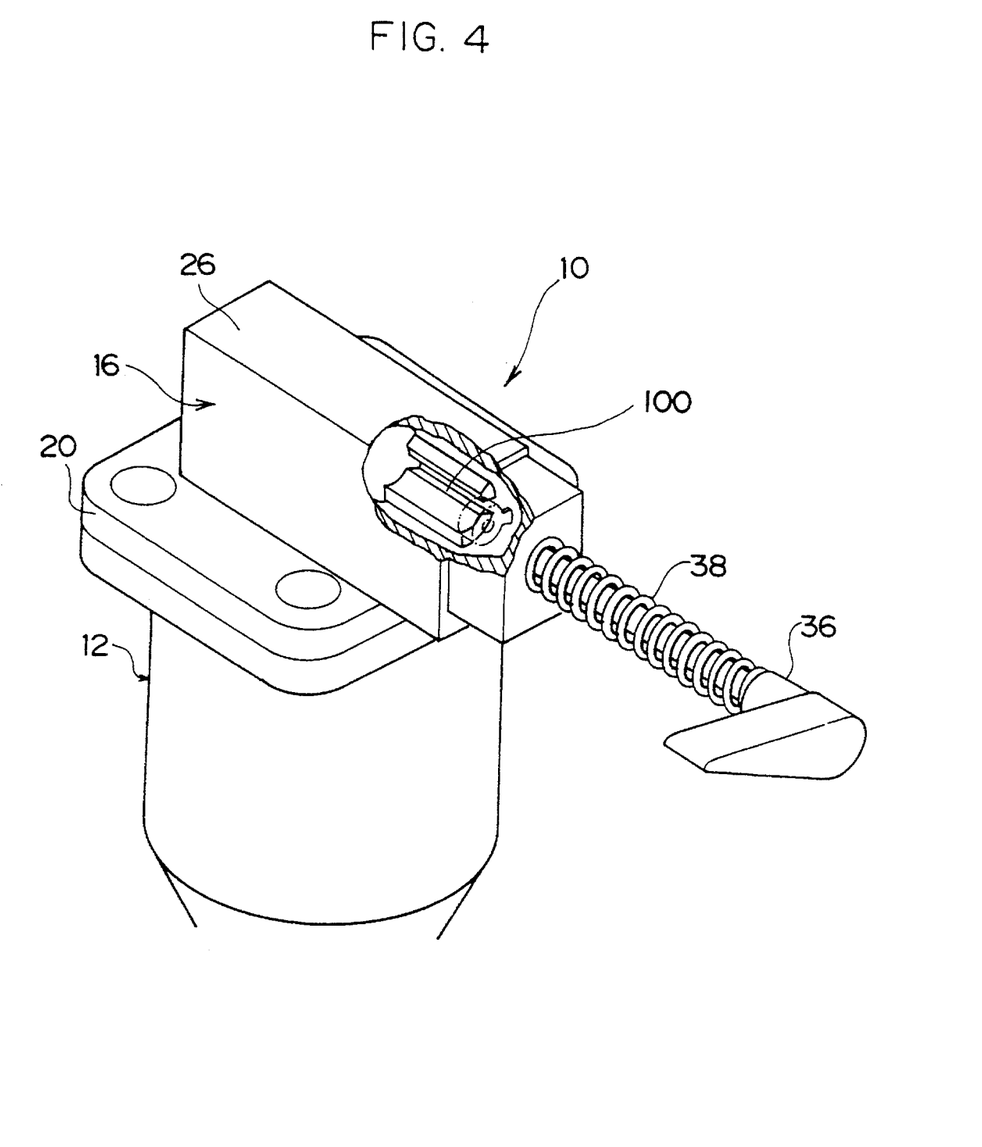
FIG. 4 is a perspective view illustrating a state in which an operation lever of the deactivating device for a locking mechanism of a pretensioner in accordance with the first embodiment of the present invention is rotated about an axis from an initial position in a forward direction, and is moved to a second position.

As shown in FIG. 3, a piece 40 serving as a distal-end member is integrally connected to a distal end of the operation lever 36, so that the piece 40 always moves integrally with the operating lever 36. A fan-shaped projection 42 is formed on the piece 40. The arrangement provided is such that the projection 42 is guided while its movement in the axial direction and its rotation about the axis are being restricted by a guide wall 100 (see FIG. 4) formed on an inner periphery of the main body 16. As also shown in FIG. 1, the operation lever 36 is continuously movable in stages in the following order: an initial position A, a second position B to which the lever 36 is rotated about the axis from the initial position A in a forward direction (in the direction of arrow V), a third position C to which the lever 36 is moved from the second position B in a pushing-in direction (in the direction of arrow W) along the axis and at which the lever 36 is held, a fourth position D to which the lever 36 is rotated about the axis from the third position C in the forward direction (in the direction of arrow X), and a fifth position E to which the lever 36 is moved from the fourth position D in a pulling-out direction (in the direction of arrow Y) along the axis.

In addition, the operation lever 36 is loaded with a coil spring 38 therearound, and is always urged in an opposite direction (in the direction of arrow Z) about the axis and in the pulling-out direction (in the direction of arrow Y) along the axis.

Furthermore, a projection 44 is formed on the operation lever 36 in the vicinity of a distal end thereof. This projection 44 is capable of engaging a retainer 46 formed on the inner peripheral wall of the main body 16. Namely, at a point of time when the operation lever 36 reaches the second position B after being rotated about the axis from the initial position A in the forward direction (in the direction of arrow V) against the urging force of the coil spring 38, and is further moved in the pushing-in direction (in the direction of arrow W) along the axis, the retainer 46 temporarily undergoes resilient deformation and then engages the projection 44, thereby allowing the operation lever 36 to be held at the third position C. Furthermore, as the operation lever 36 is rotated about the axis from the third position C in the forward direction (in the direction of arrow X) and reaches the fourth position D, the engagement between the retainer 46 and the projection 44 is canceled, so that the operation lever 36 is made movable from the fourth position D in the pulling-out direction (in the direction of arrow Y) along the axis.

The piece 40 connected to the distal end of the operation lever 36 has a pressing portion 48 which corresponds to the deactivating lever 28. The pressing portion 48 of the piece 40 is capable of pressing the deactivating lever 28 as the operation lever 36 is moved in the pushing-in direction (in the direction of arrow W) along the axis and reaches the third position C.

As described above, the movement of the operation lever 36 from the initial position A to the third position C via the second position B constitutes a deactivation operation mode for deactivating the locking mechanism, so that the operation lever 36 is capable of pressing and holding the deactivating lever 28 by moving to the third position C. Further, the returning movement of the operation lever 36 from the third position C to the initial position A via the fourth and fifth positions D and E constitutes an activation operation mode for activating the locking mechanism, in which mode the operation lever 36 is spaced apart from the deactivating lever 28 and is set in the initial state.

Next, a description will be given of the operation of the first embodiment.

In the deactivating device 10 for the locking mechanism of the pretensioner arranged as described above, in the initial state, the projection 42 formed on the piece 40 is engaged in the guide wall formed in the main body 16, and cannot be pushed in from the initial position A in the axial direction as it is. Accordingly, when the locking mechanism is deactivated to set the pretensioner 12 operative, the operation lever 36 is first rotated temporarily about the axis from the initial position A in the forward direction (in the direction of arrow V) against the urging force of the coil spring 38, so as to be moved to the second position B (in the state shown in FIG. 4). As a result, the engagement between the projection 42 and the guide wall of the main body 16 is canceled, so that the pushing-in operation of the operation lever 36 in the axial direction becomes possible.

Figure 5:
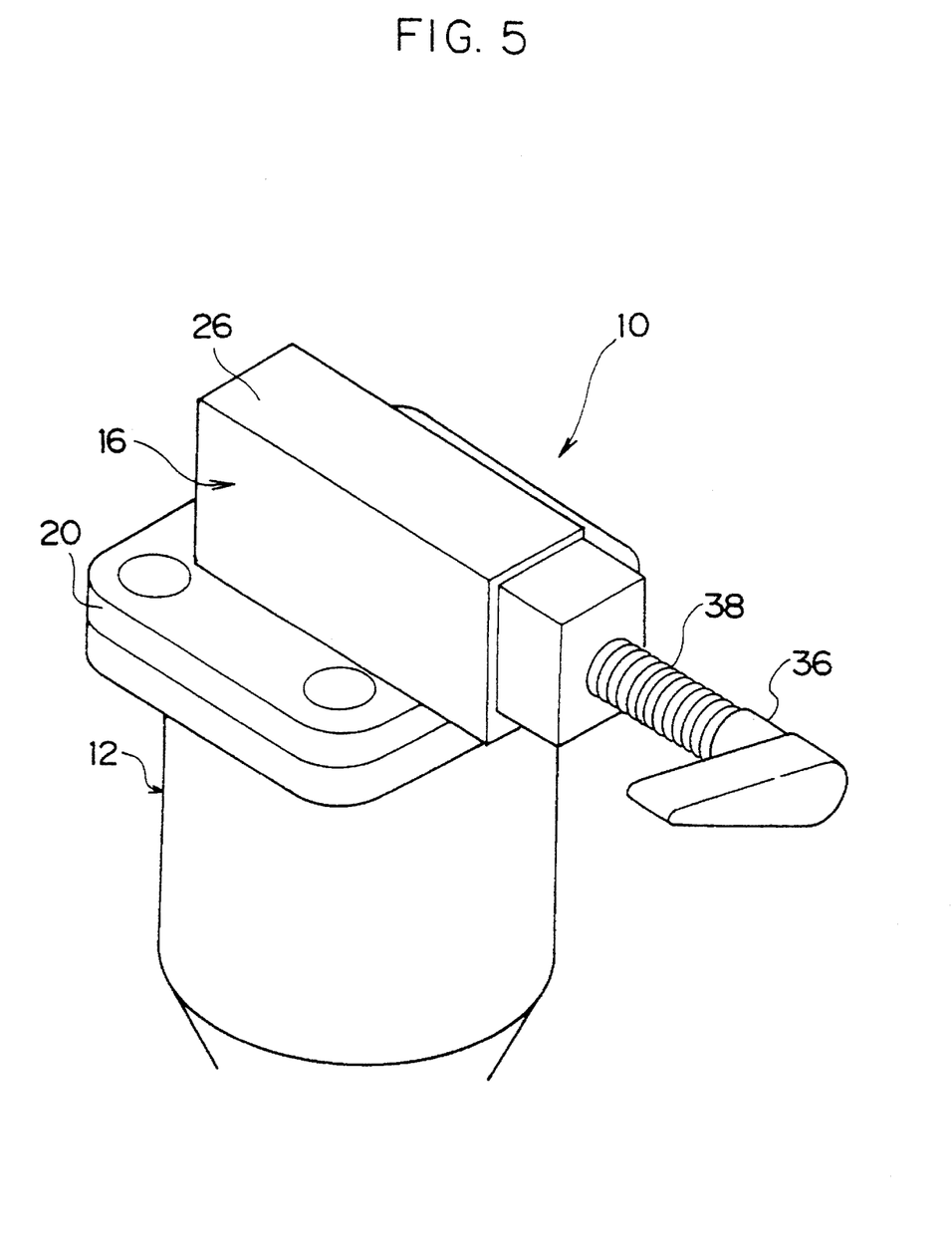
FIG. 5 is a perspective view illustrating a state in which the operation lever of the deactivating device for a locking mechanism of a pretensioner in accordance with the first embodiment of the present invention is moved from the second position in a pushing-in direction along the axis, and is held at a third position.

After the operation lever 36 is moved from the initial position A to the second position B, the operation lever 36 is further moved in the pushing-in direction (in the direction of arrow W) along the axis against the urging force of the coil spring 38, thereby allowing the operation lever 36 to be held in the third position C with the projection 44 engaging the retainer 46 (in the state shown in FIG. 5). Hence, the deactivating lever 28 is pressed by the pressing portion 48 of the piece 40, with the result that the shaft 14 together with the deactivating lever 28 is rotated against the urging force of the spring, thereby deactivating the locking mechanism.

Figure 6:
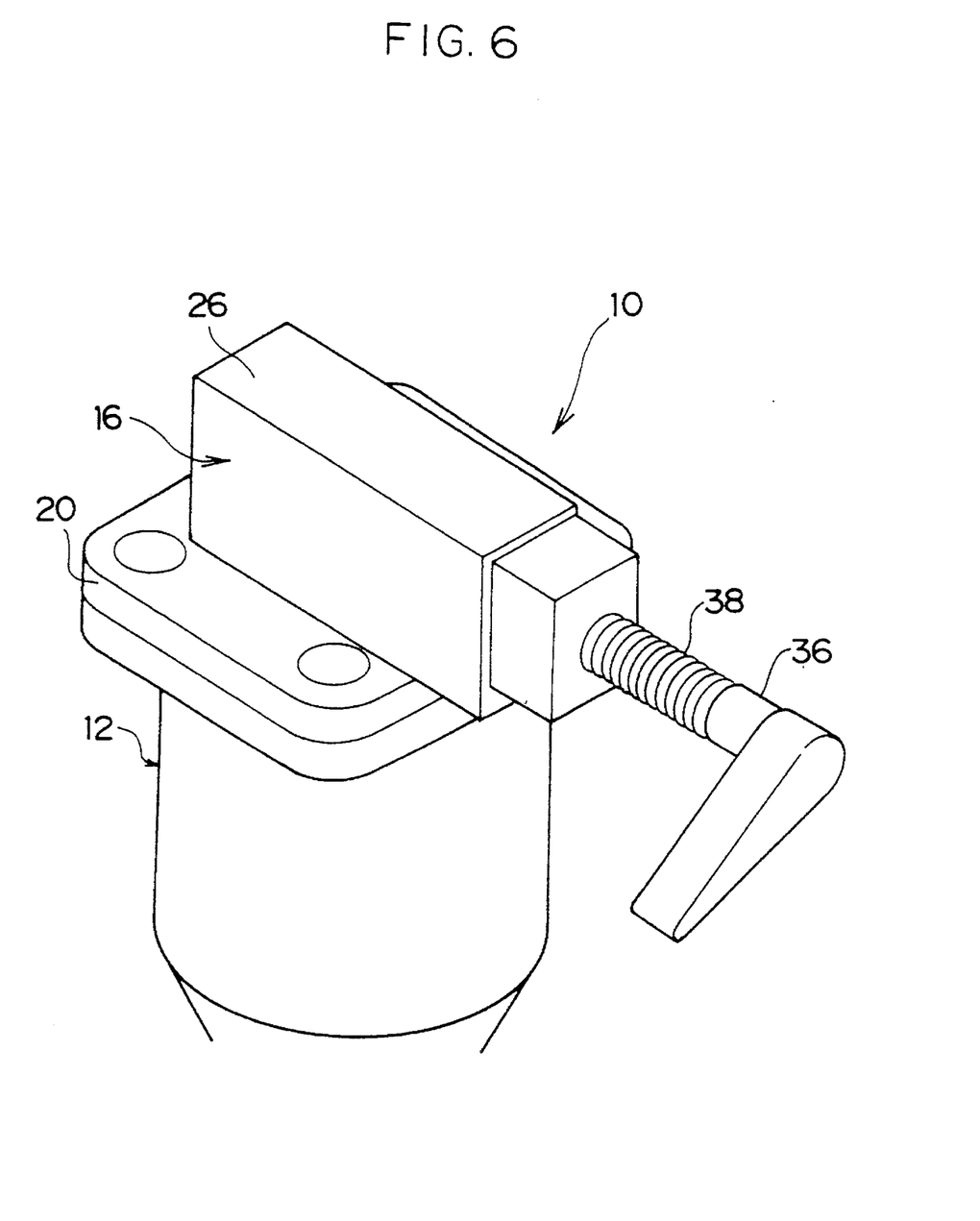
FIG. 6 is a perspective view illustrating a state in which the operation lever of the deactivating device for a locking mechanism of a pretensioner in accordance with the first embodiment of the present invention is rotated about the axis from the third position in the forward direction, and is moved to a fourth position.
Figure 7:
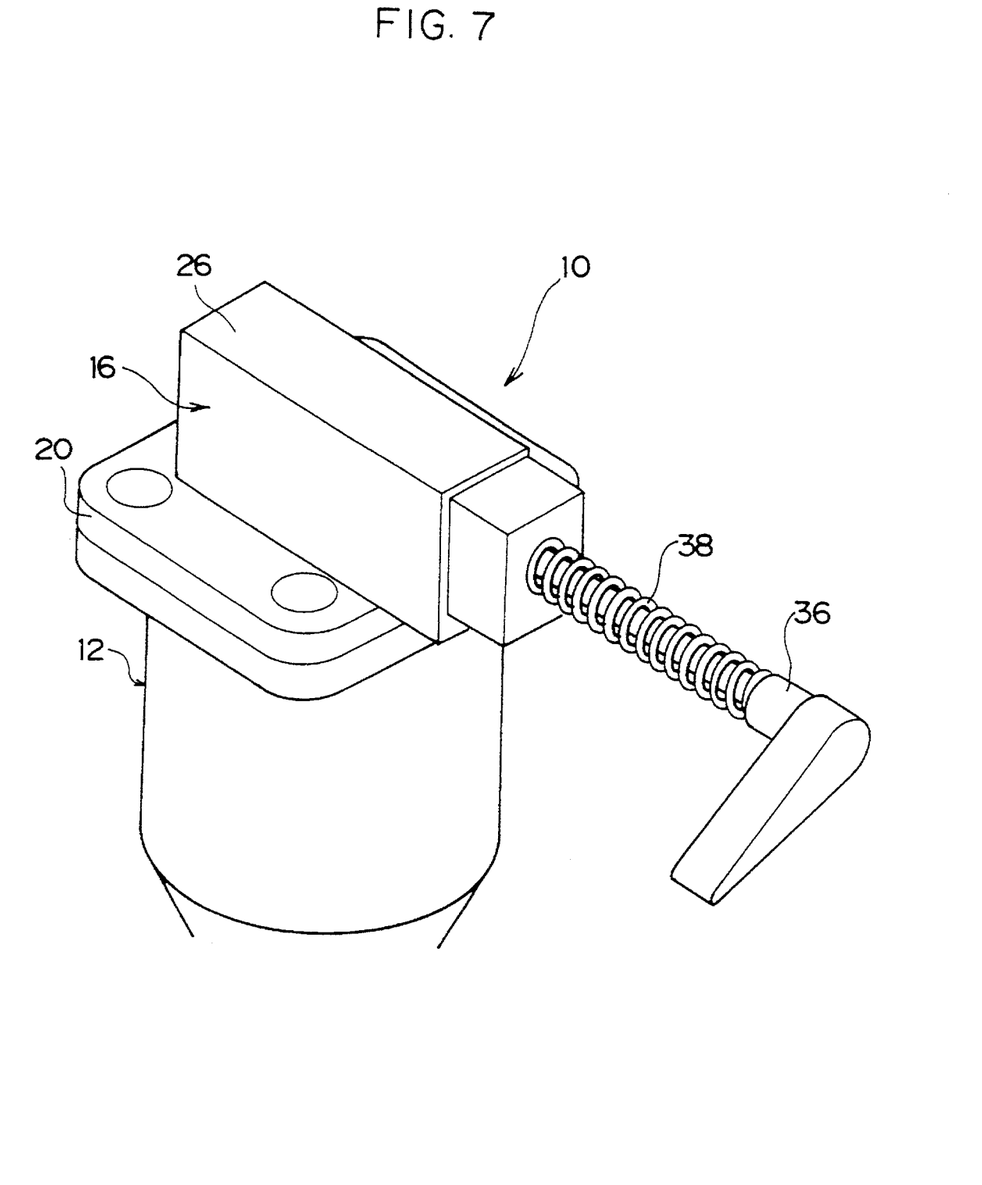
FIG. 7 is a perspective view illustrating a state in which the operation lever of the deactivating device for a locking mechanism of a pretensioner in accordance with the first embodiment of the present invention is moved to a fifth position.

Meanwhile, when the locking mechanism is activated again to set the pretensioner 12 inoperative, if the operation lever 36 is rotated about the axis from the third position C in the forward direction (in the direction of arrow X) against the urging force of the coil spring 38 (in the state shown in FIG. 6), the engagement between the projection 44 and the retainer 46 is canceled. Since the operation lever 36 is urged in the pulling-out direction (in the direction of arrow Y) along the axis, the operation lever 36 automatically moves to the fifth position E (in the state shown in FIG. 7). Since the operation lever 36 is urged in the opposite direction (in the direction of arrow Z) about the axis, the operation lever 36 automatically rotates in the direction of arrow Z upon reaching the fifth position E, thereby returning to the initial position A. As a result, the pressing portion 48 of the piece 40 is disengaged from the deactivating lever 28, and the shaft 14 is automatically rotated by the urging force of the spring so as to return to its original position, thereby allowing the locking mechanism to be activated again and setting the pretensioner 12 inoperative.

Thus, in the deactivating device 10 for the locking mechanism of the pretensioner in accordance with the present invention, when the locking mechanism is deactivated, a two-stage operating motion in different directions, i.e., the forward rotation (in the direction of arrow V) of the operation lever 36 and the pushing-in movement thereof (in the direction of arrow W) in the axial direction, is required. Accordingly, when, for example, the pretensioner 12 (and the webbing retractor) is assembled onto the vehicle body or is transported in a state in which it is detached from the vehicle body, even if the pretensioner 12 is handled carelessly and a large impact or the like acts on the operation lever 36, the operation lever 36 is prevented from being moved properly (i.e., the aforementioned two-stage operating motion is not effected). Hence, the locking mechanism is not deactivated unnecessarily. Namely, the locking mechanism can be deactivated only when it is to be actually deactivated, so that it is possible to reliably prevent the erroneous operation of the locking mechanism, i.e., the pretensioner 12.

On the other hand, when the locking mechanism is to be activated again, the operation lever 36 is automatically returned to the initial position A only by the forward rotation (in the direction of arrow X) of the operation lever 36 (i.e., by a single operating motion). Therefore, it is possible to speedily set the locking mechanism in the activated state (set the pretensioner in the inoperative state).

Next, a description will be given of a second embodiment of the present invention. It should be noted that the component parts which are basically identical to those of the first embodiment will be denoted by the same reference numerals as those of the first embodiment, and a description thereof will be omitted.

Figure 8:
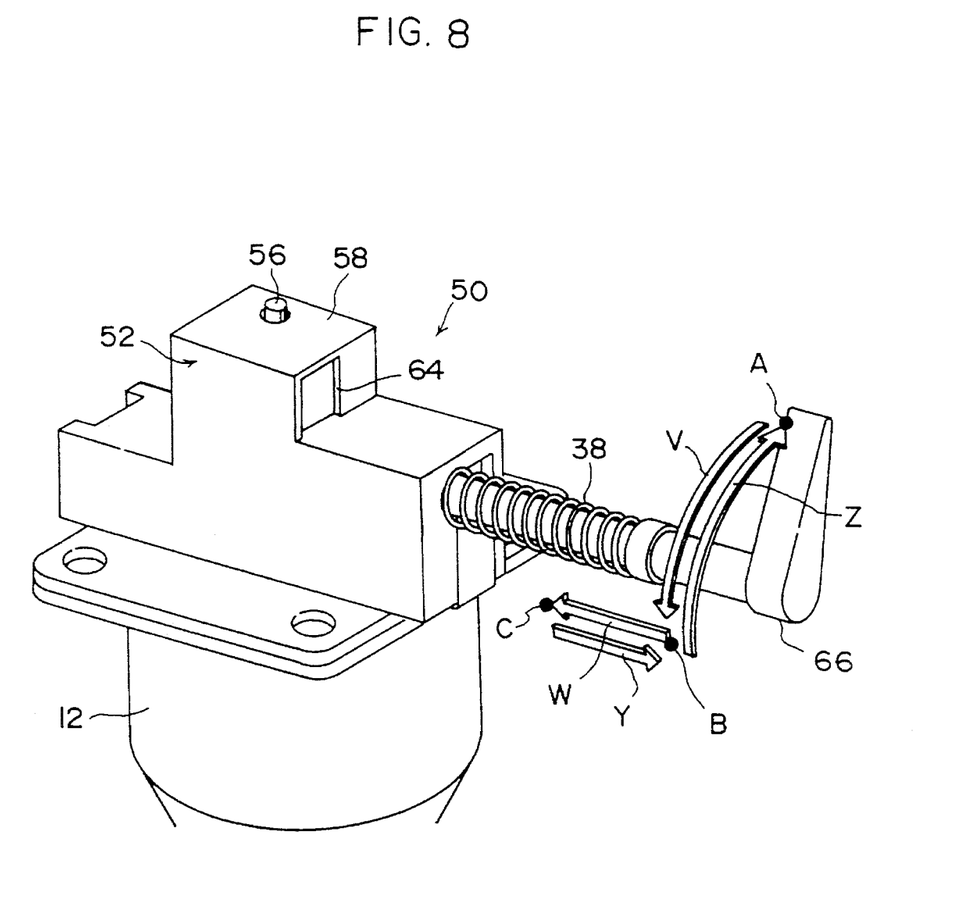
FIG. 8 is a perspective view of a deactivating device for a locking mechanism of a pretensioner in accordance with a second embodiment of the present invention.
Figure 9:
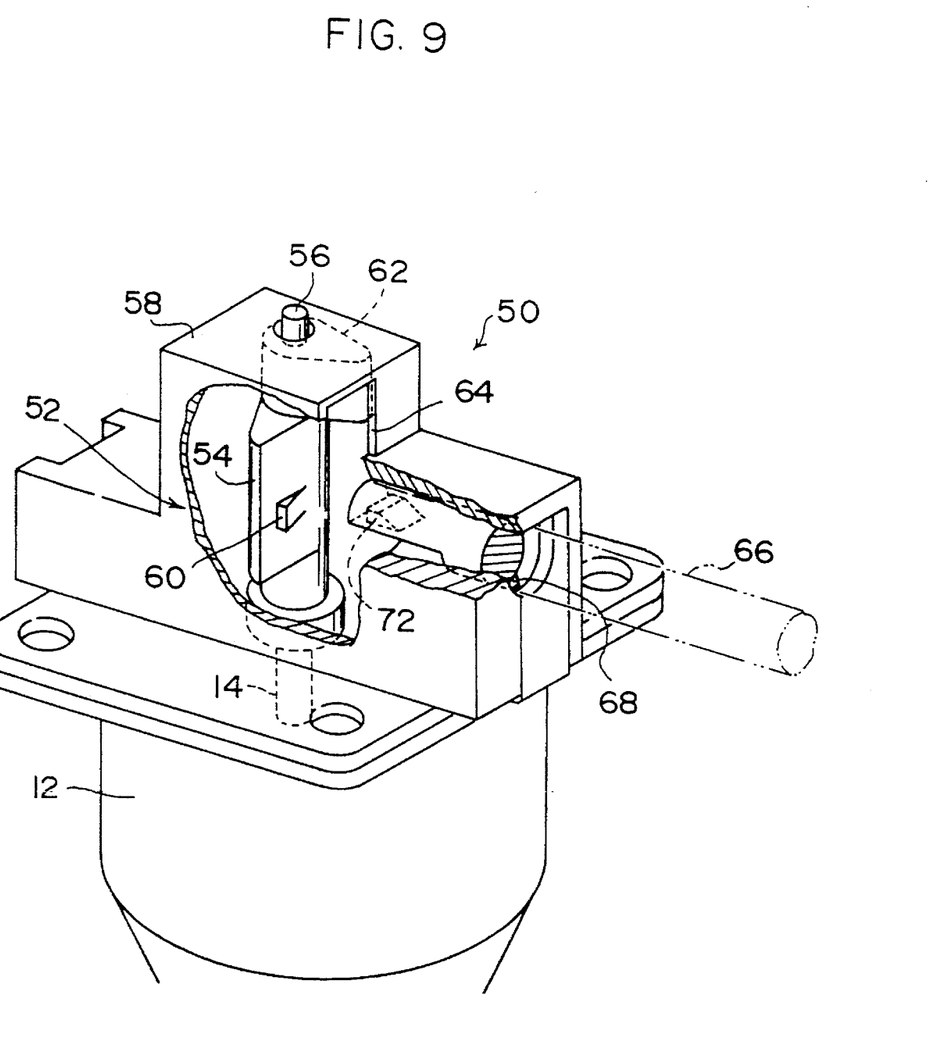
FIG. 9 is a perspective view, with portions broken away, of the deactivating device for a locking mechanism of a pretensioner in accordance with the second embodiment of the present invention, and illustrates a state in which the operation lever is set in an initial state.
Figure 10:
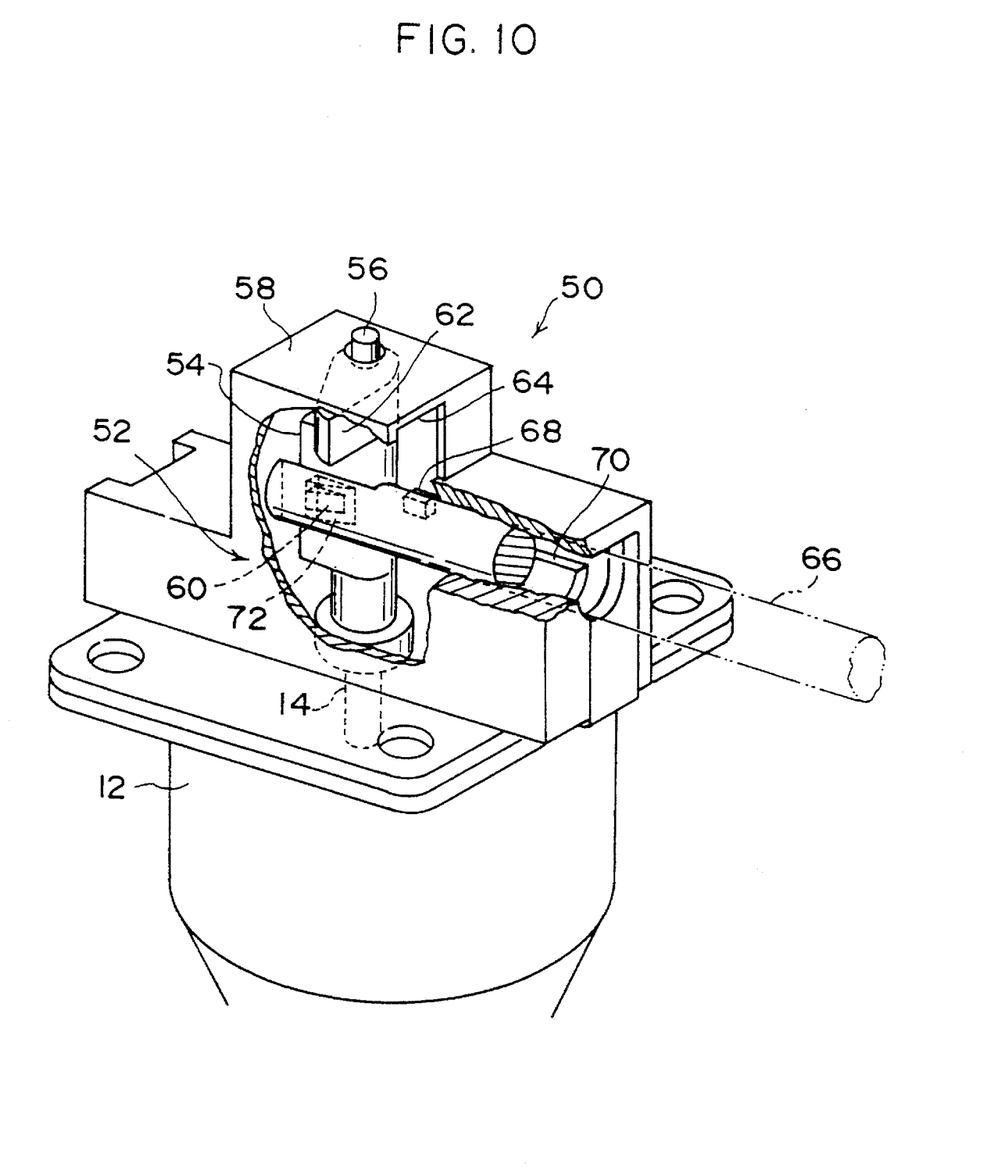
FIG. 10 is a perspective view, with portions broken away, of the deactivating device for a locking mechanism of a pretensioner in accordance with the second embodiment of the present invention, and illustrates a state in which a deactivating lever is rotated by the operation lever and is held.
Figure 11:
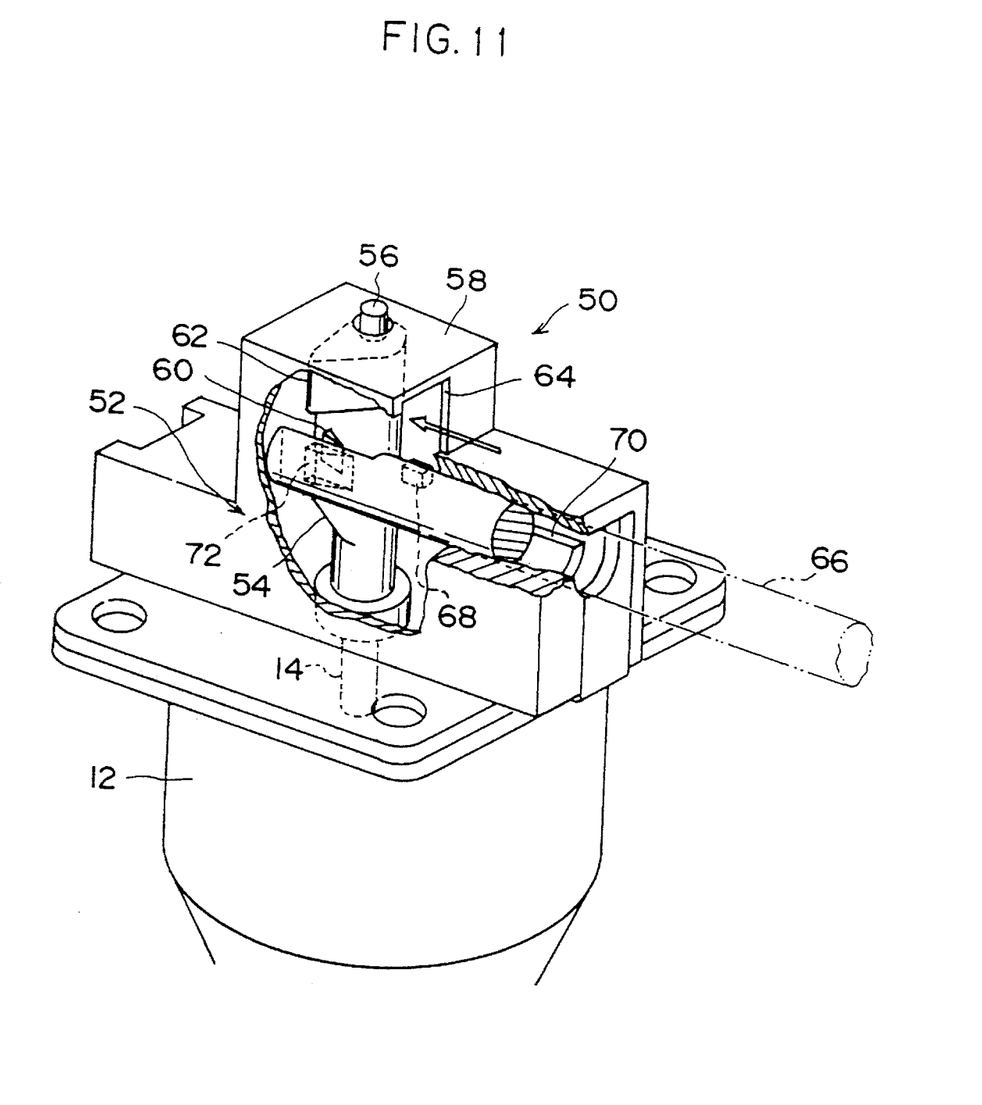
FIG. 11 is a perspective view, with portions broken away, of the deactivating device for a locking mechanism of a pretensioner in accordance with the second embodiment of the present invention, and illustrates a state in which a deactivating projection is pressed to cancel the engagement between the deactivating lever and the operation lever.

FIG. 8 shows a perspective view of a deactivating device 50 for a locking mechanism of a pretensioner in accordance with a second embodiment of the present invention. FIGS. 9 to 11 show perspective views, with portions broken away, of the deactivating device 50.

In the deactivating device 50, a deactivating lever 54 is supported in a main body 52. The deactivating lever 54 is formed in the shape of a column which is substantially elliptic (tongue-shaped) in a plan view, and an upper end of its shaft 56, which is passed through the deactivating lever 54, is supported by an upper wall 58 of the main body 52.

The shaft 14 of the pretensioner 12, which projects into the interior of the main body 52, is fitted in a lower end of the shaft 56 of the deactivating lever 54 so as to be connected to the shaft 56 of the deactivating lever 54. Consequently, the shaft 14 always rotates integrally with the deactivating lever 54. The shaft 14 is rotatively urged by a spring (not shown) incorporated in the pretensioner 12, and is maintained in a safety-mechanism activated state shown in FIG. 9 (i.e., in a state in which the pretensioner 12 is inoperative). As the shaft 14 is rotated against the urging force of the spring, the locking mechanism is deactivated (i.e., is set in a state in which the pretensioner 12 is operative).

A wedge-shaped projection 60 is formed on one side surface of the deactivating lever 54, and is capable of engaging an operation lever 66 which will be described later. Further, a deactivating projection 62 projecting substantially perpendicular to the projecting direction of the deactivating lever 54 is formed integrally with the deactivating lever 54 on an axial side thereof. The deactivating projection 62 opposes an operation opening 64 provided in a side wall of the main body 52. Accordingly, the deactivating projection 62 can be operated by being pressed from outside the main body 52 through the operation opening 64. As a result, the deactivating lever 54 can be rotated forcibly.

In addition, the operation lever 66 is supported in the main body 52 in correspondence with the deactivating lever 54 in such a manner as to be movable in its axial direction and rotatable about its axis. A projection 68 is formed in that portion of the shaft of the operation lever 66 which is located in the main body 52. The arrangement provided is such that the projection 68 is guided while its movement in the axial direction and its rotation about the axis are being restricted by a guide groove 70 formed in an inner periphery of the main body 52. As shown in FIG. 8, the operation lever 66 is continuously movable in stages in the following order: the initial position A, the second position B to which the lever 66 is rotated about the axis from the initial position A in the forward direction (in the direction of arrow V), and the third position C to which the lever 66 is moved from the second position B in the pushing-in direction (in the direction of arrow W) along the axis and at which the lever 66 is held.

A distal-end portion of the operation lever 66 is formed in a semicylindrical shape, and opposes the deactivating lever 54. As the operation lever 66 is moved in the pushing-in direction (in the direction of arrow W) along its axis and is set in the third position C, the deactivating lever 54 can be pressed.

In addition, the operation lever 66 is loaded with the coil spring 38 therearound, and is always urged in the opposite direction (in the direction of arrow Z) about the axis and in the pulling-out direction (in the direction of arrow Y) along the axis.

Furthermore, a retaining hole 72 is formed in the semicylindrical distal-end portion of the operation lever 66. This retaining hole 72 corresponds to the projection 60 of the deactivating lever 54, and the projection 60 is capable of fitting in the retaining hole 72. Namely, at a point of time when the operation lever 66 reaches the second position B after being rotated about the axis from the initial position A in the forward direction (in the direction of arrow V) against the urging force of the coil spring 38, and is further moved in the pushing-in direction (in the direction of arrow W) along the axis, and when the deactivating lever 54 is thereby pressed and rotated, the projection 60 is fitted in the retaining hole 72, thereby allowing the operation lever 66 to be held in the third position C. Further, as the deactivating lever 54 is forcibly rotated by pressing the deactivating projection 62, the projection 60 can be disengaged from the retaining hole 72. Hence, the operation lever 66 is made movable from the third position C in the pulling-out direction (in the direction of arrow Y) along the axis.

As described above, the movement of the operation lever 66 from the initial position A to the third position C via the second position B constitutes the deactivation operation mode for deactivating the locking mechanism, so that the operation lever 66 is capable of pressing and holding the deactivating lever 54 by moving to the third position C. Further, the returning movement of the operation lever 66 from the third position C to the initial position A via the second position B constitutes the activation operation mode for activating the locking mechanism, in which mode the operation lever 66 is spaced apart from the deactivating lever 54 and is set in the initial state.

Next, a description will be given of the operation of the second embodiment.

In the deactivating device 50 for the locking mechanism of the pretensioner arranged as described above, when the locking mechanism is activated to set the pretensioner 12 inoperative, the operation lever 66 is held by being spaced apart from the deactivating lever 54 by the urging force of the coil spring 38, as shown in FIG. 9. Also, in this state, since the projection 68 of the operation lever 66 does not correspond to the guide groove 70 in the main body 52 and its axial movement is restricted, the operation lever 66 cannot be pushed in from the initial position A in the axial direction as it is. Accordingly, when the locking mechanism is deactivated to set the pretensioner 12 operative, the operation lever 66 is first rotated temporarily about the axis from the initial position A in the forward direction (in the direction of arrow V) against the urging force of the coil spring 38, so as to be moved to the second position B. As a result, the projection 68 of the operation lever 66 opposes the guide groove 70 in the main body 52, so that the operation lever 66 becomes movable in its axial direction.

After the operation lever 66 is moved to the second position B by being rotated, the operation lever 66 is further moved in the pushing-in direction (in the direction of arrow W) along the axis against the urging force of the coil spring 38, whereby the deactivating lever 54 is rotated by being pressed by the semicylindrical distal-end portion of the operation lever 66. Further, the projection 60 is fitted in the retaining hole 72, thereby allowing the operation lever 66 to be held in the third position C. Hence, the shaft 14 together with the deactivating lever 54 is rotated against the urging force of the spring, thereby deactivating the locking mechanism (in the state shown in FIG. 10).

Meanwhile, when the locking mechanism is activated again to set the pretensioner 12 inoperative, as indicated by the arrow in FIG. 11, the deactivating projection 62 is pressed by a tool, such as a screwdriver, from outside the main body 52 through the operation opening 64, so as to forcibly rotate the deactivating lever 54 and disengage the projection 60 from the retaining hole 72 (in the state shown in FIG. 11). As a result, the operation lever 66 becomes movable from the third position C in the pulling-out direction (in the direction of arrow Y) along the axis. Further, since the operation lever 66 is urged in the pulling-out direction (in the direction of arrow Y) along the axis, the operation lever 66 automatically moves to the second position B. Additionally, since the operation lever 66 is urged about the axis in the opposite direction (in the direction of arrow Z), the operation lever 66 automatically rotates in the direction of arrow Z upon reaching the second position B, and returns to the initial position A. As a result, the distal-end portion of the operation lever 66 is disengaged from the deactivating lever 54, and the shaft 14 is automatically rotated by the urging force of the spring so as to return to its original position, thereby allowing the locking mechanism to be activated again and setting the pretensioner 12 inoperative.

Thus, in the deactivating device 50 for the locking mechanism of the pretensioner in accordance with the second embodiment, when the locking mechanism is deactivated, a two-stage operating motion in different directions, i.e., the forward rotation (in the direction of arrow V) of the operation lever 66 and the pushing-in movement thereof (in the direction of arrow W) in the axial direction, is required. Accordingly, when, for example, the pretensioner 12 (and the webbing retractor) is assembled onto the vehicle body or is transported in a state in which it is detached from the vehicle body, even if the pretensioner 12 is handled carelessly and a large impact or the like acts on the operation lever 66, the operation lever 66 is prevented from being moved properly (i.e., the aforementioned two-stage operating motion is not effected). Hence, the locking mechanism is not deactivated unnecessarily. Namely, the locking mechanism can be deactivated only when it is to be actually deactivated, so that it is possible to reliably prevent the erroneous operation of the locking mechanism, i.e., the pretensioner 12.

On the other hand, when the locking mechanism is to be activated again, the projection 60 is disengaged from the retaining hole 72 as the deactivating projection 62 is pressed from outside the main body 52 through the operation opening 64, so that the operation lever 66 automatically returns to the initial position A. Therefore, it is possible to speedily set the locking mechanism in the activated state (set the pretensioner in the inoperative state).

What is claimed is:

1. A deactivating device for a locking mechanism of a pretensioner, for use in a pretensioner which is provided in such a manner as to be capable of forcibly retracting an occupant-restraining webbing of a webbing retractor and has a locking mechanism capable of setting the pretensioner in an operative state and in an inoperative state, said deactivating device comprising:

an operation lever provided movably about a central axis of rotation and in a direction of the central axis of rotation, and adapted to set said locking mechanism in one of an activated state and a deactivated state; and an urging member for imparting an urging force to said operation lever, wherein said operation lever has a deactivation operation mode for setting said locking mechanism in the deactivated state and an activation operation mode for setting said locking mechanism in the activated state, and in said deactivation operation mode, said operation lever moves continuously in stages about the central axis of rotation against the urging force of said urging member and in the direction of the central axis of rotation against the urging force of said urging member and a position of said operation lever is subsequently held, while in said activation operation mode, said operation lever is automatically made to undergo returning movement by the urging force of said urging member from the deactivation operation mode.

2. A deactivating device for a locking mechanism of a pretensioner according to claim 1, wherein said operation lever has an initial position, a second position to which said operation lever is rotated about the central axis of rotation by a predetermined amount from the initial position in a first direction against the urging force of said urging member, and a third position to which said operation lever is moved from the second position by a predetermined amount in a second direction in the direction of the central axis of rotation against the urging force of said urging member and at which the position of said operation lever is held, and wherein the deactivation operation mode includes the movement of said operation lever from the initial position to the third position via the second position and the holding of the position of said operation lever at the third position.

3. A deactivating device for a locking mechanism of a pretensioner according to claim 2, wherein said operation lever further has a fourth position to which said operation lever is rotated from the third position in the first direction by a predetermined amount and a fifth position to which said operation lever is moved from the fourth position by a predetermined amount in a third direction which is an opposite direction to the second direction, and wherein the activation operation mode includes the cancellation of a state in which the position of said operation lever is held, and the automatic returning movement of said operation lever from the fourth position to the initial position via the fifth position by the urging force of said urging member.

4. A deactivating device for a locking mechanism of a pretensioner according to claim 2, wherein the activation operation mode includes the cancellation of a state in which the position of said operation lever is held, and the automatic returning movement of said operation lever from the third position to the initial position via the second position by the urging force of said urging member.

5. A deactivating device for a locking mechanism of a pretensioner according to claim 1, further comprising:

a deactivating member provided in such a manner as to be capable of abutting against said operation lever, and connected to said locking mechanism of said pretensioner, said deactivating member being adapted to set said locking mechanism in one of the activated state and the deactivated state by imparting a pressing force of said operation lever to said locking mechanism of said pretensioner.

6. A deactivating device for a locking mechanism of a pretensioner according to claim 5, wherein said deactivating member has a deactivating lever which is formed in a shape of a column and is provided in such a manner as to be rotatable by the pressing force of said operation lever.

7. A deactivating device for a locking mechanism of a pretensioner according to claim 6, wherein said deactivating member has a shaft member which is provided coaxially with said deactivating lever and is connected to said locking mechanism of said pretensioner, said shaft member being adapted to transmit the pressing force of said operation lever to said locking mechanism of said pretensioner via said deactivating lever.

8. A deactivating device for a locking mechanism of a pretensioner according to claim 5, wherein said operation lever has a distal-end member at a distal end thereof, and said distal-end member is connected to said operation lever integrally therewith and is adapted to press said deactivating member.

9. A deactivating device for a locking mechanism of a pretensioner according to claim 1, further comprising:

a retainer disposed in such a manner as to be capable of engaging said operation lever so as to hold the position of said operation lever when said retainer is engaged with said operation lever.

10. A deactivating device for a locking mechanism of a pretensioner according to claim 9, wherein said operation lever has a projection in a vicinity of a distal-end portion of said operation lever, said projection being disposed in such a manner as to be capable of engaging said retainer.

11. A deactivating device for a locking mechanism of a pretensioner according to claim 1, further comprising:

a deactivating member provided in such a manner as to be capable of engaging said operation lever, and connected to said locking mechanism of said pretensioner, said deactivating member being adapted to set said locking mechanism in one of the activated state and the deactivated state by imparting a pressing force of said operation lever to said locking mechanism of said pretensioner.

12. A deactivating device for a locking mechanism of a pretensioner according to claim 11, wherein said deactivating member has a deactivating lever which is formed in a shape of a column and is provided in such a manner as to be rotatable by the pressing force of said operation lever.

13. A deactivating device for a locking mechanism of a pretensioner according to claim 12, wherein said deactivating member has a shaft member which is provided coaxially with said deactivating lever and is connected to said locking mechanism of said pretensioner, said shaft member being adapted to transmit the pressing force of said operation lever to said locking mechanism of said pretensioner via said deactivating lever.

14. A deactivating device for a locking mechanism of a pretensioner according to claim 12, wherein said deactivating member has a deactivating projection which is provided integrally with said deactivating lever, so as to cancel the engagement between said operation lever and said deactivating member as a pressing force is imparted to said deactivating projection.

15. A deactivating device for a locking mechanism of a pretensioner according to claim 12, wherein said deactivating member has a deactivating-member projection which is provided in such a manner as to be capable of engaging said operation lever.

16. A deactivating device for a locking mechanism of a pretensioner according to claim 15, wherein said operation lever has an engaging member which is provided in such a manner as to be capable of engaging said deactivating-member projection, so as to hold the position of said operation lever when said engaging member is engaged with said deactivating-member projection.

17. A deactivating device for a locking mechanism of a pretensioner according to claim 14, further comprising:

a main body of said deactivating device for said locking mechanism of said pretensioner, said main body of said deactivating device being adapted to support said operation lever and being attached to said pretensioner.

18. A deactivating device for a locking mechanism of a pretensioner according to claim 17, wherein said main body of said deactivating device has an opening which is provided such that a pressing force can be imparted from outside to said deactivating projection through said opening.

19. A deactivating device for a locking mechanism of a pretensioner according to claim 17, wherein said main body of said deactivating device has a guide groove for restricting the movement of said operation lever and guiding said operation lever about the central axis of rotation and in the direction of the central axis of rotation of said operation lever.

20. A deactivating device for a locking mechanism of a pretensioner according to claim 19, wherein said operation lever has a projection which is fitted in said guide groove.

21. A deactivating device for a locking mechanism of a pretensioner according to claim 8, further comprising:

a main body of said deactivating device for said locking mechanism of said pretensioner, said main body of said deactivating device being adapted to support said operation lever and being attached to said pretensioner.

22. A deactivating device for a locking mechanism of a pretensioner according to claim 21, wherein said main body of said deactivating device has a guide groove for restricting the movement of said operation lever and guiding said operation lever about the central axis of rotation and in the direction of the central axis of rotation of said operation lever.

23. A deactivating device for a locking mechanism of a pretensioner according to claim 22, wherein said distal-end member has a projection which is fitted in said guide groove.

* * * * *